United States Patent Office 3,327,482
Patented June 27, 1967

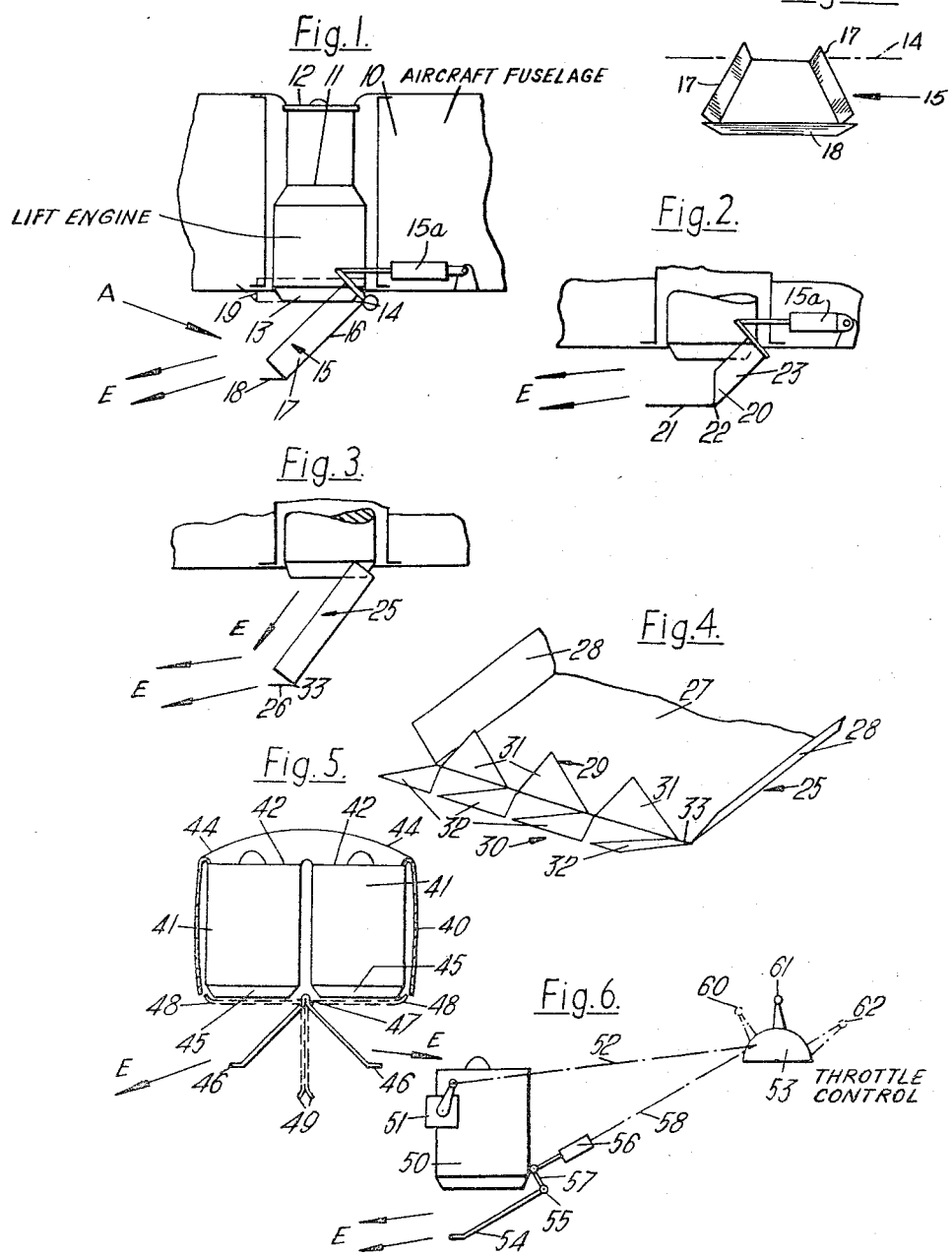

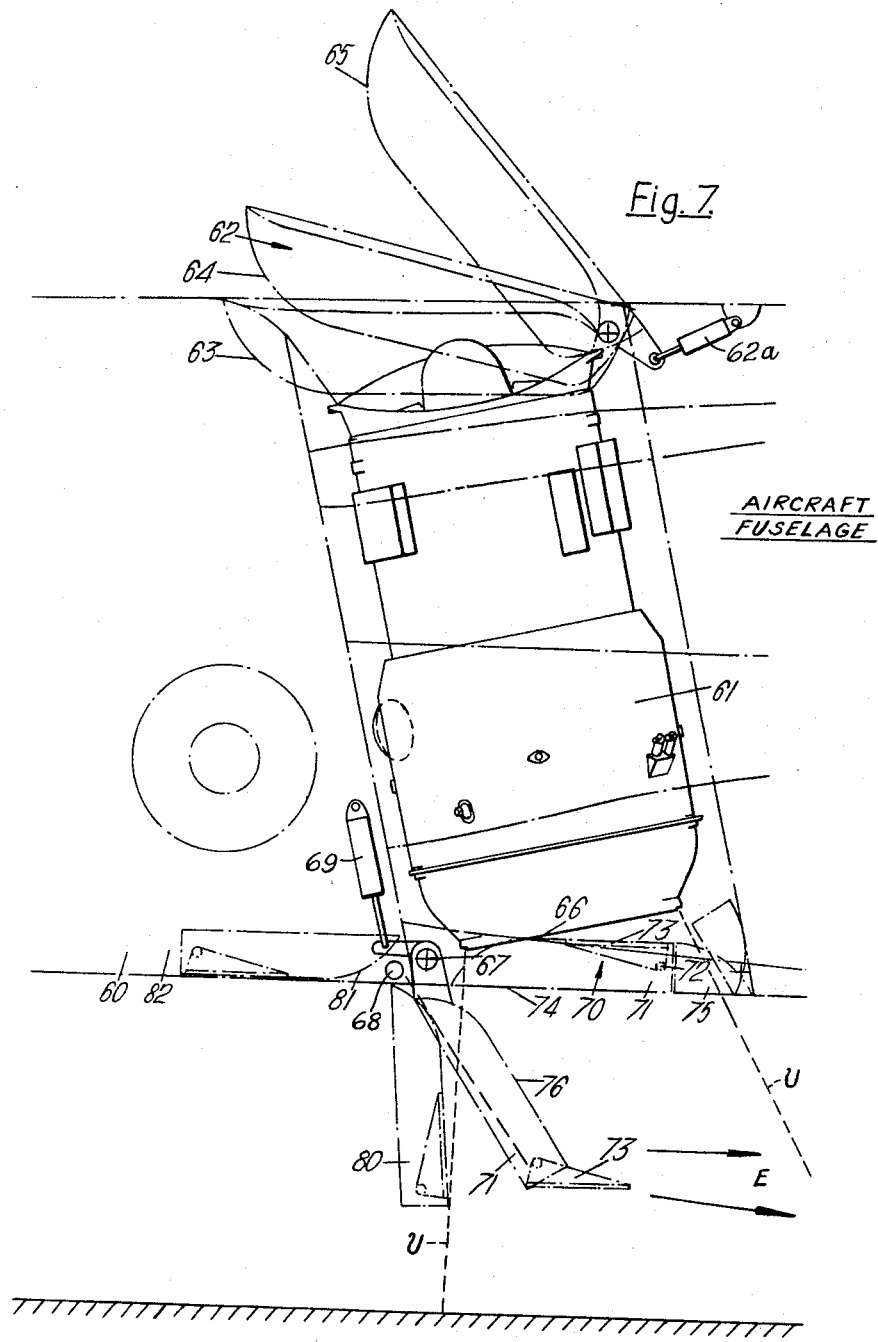

3,327,482
VERTICAL LIFT JET ENGINES
Malcolm Roy Pike, Nottingham, England, assignor to Rolls-Royce Limited
Filed June 30, 1964, Ser. No. 379,103
Claims priority, application Great Britain, July 2, 1963, 26,106/63
7 Claims. (Cl. 60—271)

This invention comprises improvements in or relating to vertical lift jet engines, i.e. engines adapted to produce vertical lift forces on an aircraft independently of those generated aerodynamically by forward flight of the aircraft.

In aircraft adapted for vertical take-off and landing which have engines disposed with their axes vertical or nearly vertical so as to provide direct lift for the aircraft, a considerable problem arises when the aircraft takes-off from or lands on an unprepared surface, e.g. a grass surface, since the effect of the jet efflux on the surface is to erode away considerable amounts of surface material.

According therefore to the present invention, there is provided a vertical lift jet engine which has a thrust to weight ratio of at least 8:1 and which is provided, adjacent its outlet nozzle, with at least one deflector having both a main portion and a toe portion which is disposed or disposable at an angle thereto, the or each deflector being movable between an operative position in which downwardly directed jet efflux from the engine impinges on both the main portion and the toe portion so as to be deflected thereby away from the vertical, and an inoperative position in which the jet efflux is not so deflected.

It will be appreciated that, in the case of the present invention, the jet efflux can be deflected by the or each deflector until the engine has run-up to take-off power, when the or each deflector may be moved to the inoperative position so that the undeflected jet efflux of the engine may cause the aircraft to take-off. Obviously this procedure prevents the erosion which would otherwise be produced while the engines are being started and run-up to take-off power.

The or each deflector is preferably movable into and out of a further position in which it blanks off the said outlet nozzle.

The or each deflector may pe movable into and out of a retracted position in which it is spaced from its outlet nozzle and is so disposed as to minimise drag during forward flight. Additionally, or alternatively, the or each deflector may be movable into and out of a vertical position in which it assists re-starting of the engine during forward flight.

Preferably, when the engine is in operation and is vertically disposed and when the or each deflector is in the operative position, the jet efflux impinging on the or each deflector will be deflected thereby to strike a horizontal surface at an angle of not more than 30°.

The or each deflector may be trough shaped, while the toe portion may have alternate parts which are arranged at an angle to each other.

The engine may have a throttle control which controls the operation of the or each deflector, the throttle control placing the or each deflector in the operative position while the engine is being started to run up to ground idling speed, and placing the or each dejector in the inoperative position when the engine is being run at take-off speed.

The invention also comprises an aircraft in which is substantially vertically mounted at least one vertical lift jet engine as set forth above.

The invention is illustrated merely by way of example, in the accompanying drawings, in which:

FIGURE 1 is a diagrammatic section through the fuselage of an aircraft provided with a vertical lift jet engine according to the invention;

FIGURE 1A is a perspective view of a deflector provided on the engine shown in FIGURE 1, the view being taken in the direction of the arrow A in FIGURE 1.

FIGURE 2 is a diagrammatic section similar to FIGURE 1, but showing an engine having a different type of deflector;

FIGURE 3 is a view similar to FIGURE 2 but shows a stil further modification;

FIGURE 4 is a perspective view of the end part of the deflector shown in FIGURE 3;

FIGURE 5 is a cross-section through the fuselage of an aircraft having adjacent vertical lift jet engines according to the invention;

FIGURE 6 is a diagrammatic view of an engine according to the invention having a throttle control which controls a deflector; and FIGURE 7 is a diagrammatic view showing yet another vertical lift jet engine mounted in a fuselage of an aircraft.

In FIGURE 1 there is shown a part of an aircraft fuselage 10 in which there is vertically mounted a vertical lift gas turbine engine 11 having a thrust to weight ratio of at least 8:1 and preferably of at least 12:1. Thus it may have a thrust to weight ratio of 16:1 or even more. The engine 11 has an inlet 12 in the upper surface of the fuselage 10, an a propelling nozzle 13 mounted in the lower surface of the fuselage 10. A deflector 15 is disposed adjacent to the nozzle 13, the deflector 15 being mounted on a hinge 14 carried by the fuselage 10. The deflector 15 comprises a rectangular flat plate 16 (FIGURE 1A), and two side plates 17 which are mounted perpendicular to the flat plate 16 at its edges so as to form a deflector flap substantially U-shaped in cross section. The side plates 17 depend from opposite edge of the flat plate 16 and the hinge 14 lies along one of the other two edges of the plate 16.

At the fourth edge of the plate 16 there is a toe 18. This toe takes the form of a part of the plate 16 which projects beyond the ends of the side plates 17 and which is bent up at an angle of up to 90° to the flat plate 16 so as to project from the surface of the plate 16 which is nearer to the nozzle 13 of the engine 11.

Thus it will be seen that in the position shown in full lines in FIGURE 1, the flat plate 16, side plates 17, and toe 18 provide a trough shaped deflector member into the concavity of which the efflux of gas from the engine 11 is directed, and a projecting toe 18 which projects into the gas stream.

In normal circumstances, actuator means, indicated diagrammatically at 15a would be used to rotate the deflector 15 about its hinge 14. In FIGURE 1 the broken outline 19 shows the position of the deflector 15 when it has been rotated about its hinge 14 by its actuator means so as to lie flush with the lower surface of the fuselage 10. It will be seen that in this position the deflector 15 acts as a closure member for the nozzle 13 of the engine 11 and for a space surrounding the latter.

The deflector 15 may equally well be rotated in an anticlockwise direction as shown in the drawings so that it lies completely clear of the efflux from the engine 11.

Referring now to the embodiment of FIGURE 2, it will be seen that this embodiment has a deflector 20 which is similar to the deflector 15. However, the deflector 20 has a toe 21 which is very much larger than the toe 18 of the deflector 15. Moreover, the deflector 20 has a flat plate 22 and side walls 23 which are considerably shorter than the flat plate 16 and side walls 17 of the deflector 15.

The embodiment shown in FIGURE 3 includes a deflector 25 which is similar to the deflector 15, but in this case the deflector 25 has a toe 26 which, as shown in FIGURE 4 is made in a "castellated" form. The deflector 25 comprises a flat plate 27 and side walls 28 which are similar to the flat plate 16 and side walls 17 of FIGURE 1. The toe 26 is however cut to form a series of sections which are disposed in two rows 29 and 30.

The row 29 is made up of three triangular projections 31 which lie with their bases on the extremity 33 of the flat plate 27 and project perpendicularly to the plate 27. The row 30 is made up of truncated triangular pieces 32 supported from their truncated apices. These pieces 32 lie at an angle of approximately 45 degrees to the pieces 31 and project beyond the extremity 33 of the plate 27.

In FIGURE 5 there is shown a diagrammatic transverse section of an aircraft fuselage 40 in which two engines 41 are mounted side by side. The engines 41 have intakes 42 which lie in the upper surface of the fuselage 40 and doors 44 are provided to blank off these intakes when the engines 41 are out of use. The engines 41 have propelling nozzles 45 which lie in the lower surface of the fuselage 40. Each of the engines 41 is provided with a deflector 46 which may be similar to any of the deflectors shown in the previous figures, but is shown as being similar to that of FIGURE 1. These deflectors 46 are hinged about a common hinge 47 which extends axially along the fuselage 40 of the aircraft.

The deflectors 46 are shown in their three alternative positions. In the position shown in full lines the deflectors 46 will deflect the efflux from the engine 41 to opposite sides of the aircraft fuselage 40. In their upper position, shown in broken lines at 48, the deflectors 46 blank off the outlets from the engines 41 and provide a smooth lower surface to the fuselage 40. In their lower position, shown in broken lines at 49, the deflectors 46 hang vertically down and do not interfere with the efflux from the engines 41.

The actuator means which are necessary to deflect the deflectors 46 about their hinge 47 are not shown in this drawing.

FIGURE 6 shows diagrammatically an engine 50 having a fuel control unit 51 which is controlled (as indicated by chain dotted lines 52) from a throttle control 53. A deflector 54 is used to deflect the efflux of gas from the engine 50, the deflector being similar to that shown in FIGURE 1. The deflector is hinged at 55 and a ram 56, which may be hydraulic or pneumatic, may rotate the deflector 54 about its hinge 55 by way of extension pieces 57. As indicated by chain dotted lines 58, the ram 56 is also controlled by the throttle control 53. Thus when the throttle control 53 is moved into a shutdown position 60, the ram 56 will be caused to actuate the deflector 54 to its position in which it blanks off the nozzle of the engine 50. On moving the throttle control 53 to a running-up position 61, the ram 56 will cause the deflector 54 to move to the position in which it is shown in FIGURE 6 and in which it will deflect the exhaust gases from the engine 50 away from the ground to prevent erosion of the ground while the engine 50 is run up to speed. When the throttle control 53 is moved to a take-off position 62, the ram 56 moves the deflector 54 so that it hangs vertically downwards and does not interfere with the take-off thrust of the engine 50.

In tests which have been carried out, it has been found that a device similar to that shown in FIGURE 1, but without the toe 18 produces a deflection of approximately 45 degrees to its normal direction when the deflector is also at 45 degrees to the normal axes of the flow of the efflux gas. However when a toe such as that shown at 18 is added, the deflection angle of the gases is increased to 72 degrees without alteration of the angle of the deflector. Thus it will be seen that the addition of the toe provides an increase in the deflection produced. Similar tests have shown that deflectors with toes such as 18 produce very much less ground erosion than that caused by either deflectors without toes or by the engines without any means of thrust deflection at all.

The direction of the deflected jet efflux is indicated in each of the drawings by the arrow E. It is preferable, in order to reduce the erosion of an unprepared surface to a reasonable level, if the efflux may be deflected so as to impinge on the surface at an angle of about 30 degrees or less.

It will be appreciated that many modifications may be made to the embodiments described without departing from the scope of the invention as defined by the claims. Thus although the basic member of the deflector (e.g., 16 in FIGURE 1) has been described as a flat plate, this plate may quite well be curved in more than one direction so as to fit it to the external contours of the aircraft. The movement of the deflector has been described as being a rotation about a hinge which may be actuated by a mechanical or pneumatic ram; however it may be convenient to mount the deflector so that it does not just pivot but might make a complicated mixture of rotational and translational movements. Moreover, the movements of the deflector may be actuated by any known means.

It will be noted that in the deflectors shown in the drawings, the toe is in all cases at the extremity of the plate distant from the engine. Although this is not absolutely essential, the putting of the toe in this position causes the back pressure on the engine, due to the toe, to be reduced.

The dimensions of the toe and the plate, and the angle at which the toe is set are chosen to be such as to produce the required deflection while not being such as to cause the efflux to pass over the surface of the aircraft and cause overheating.

As an alternative to attaching pairs of deflectors to a single hinge, it may be preferable to mount the deflectors on separate hinges so that they project in the same direction. In this case, the efflux gases of the engines all are directed in one direction, and any induced flow of external air causes the efflux gases to be blown away from the aircraft, whereby to reduce the risk of the efflux gases being re-ingested into the engines.

In FIGURE 7 there is shown the fuselage 60 of an aircraft in which is mounted at 12½° to the vertical, a vertical lift gas turbine jet engine 61. The engine 61 has an air intake scoop 62. The air intake scoop 62 may be moved by means of an actuator 62a between a position 63 in which it closes the air intake of the engine 61 and merges smoothly into the upper surface of the fuselage 60, a position 64 in which it is placed for effecting restarting of the engine 61 in forward flight, and a position 65 in which it is placed during hovering and slow forward speeds.

The engine 61 has a nozzle 66 adjacent to which there is disposed a pivot 67 on which is mounted a deflector 70. The deflector 70 has a trough-shaped main portion 71 within which is mounted a pivot 72 carrying a toe portion 73. The toe portion 73 may be moved about the pivot 72 by means of actuating linkage 68.

The undeflected jet efflux is indicated by the broken lines U in FIGURE 7. The deflector 70 may be moved, by means of an actuator 69, between an inoperative horizontal position 74 in which, in association with a pivoted trough member 75, it blanks off the nozzle 66; an operative inclined position 76 in which the toe portion 73 is caused by means of actuating linkage 68 to extend outwardly of the main portion 71 and both portions 71, 73 deflect the jet efflux away from the vertical into the direction E during ground running; a vertical position 80 in which the deflector acts as a scuttle so as to assist restarting of the engine during forward flight; and a retracted horizontal position 81 in which the deflector is spaced from the nozzle 66 and is disposed in a wheelbay 82 so as to minimise drag during forward flight.

As will be noted, the toe portion 73 is disposed within the main portion 71 in positions 74, 80 and 81.

The deflector 70 may, moreover, be allowed to hang freely during the transition between vertical and forward flight, that is to say it may be allowed to take up an equilibrium attitude under the influence of the forces imposed by the aircraft forward speed and the jet efflux. This enables drag to be minimised.

What I claim is:

1. A vertical lift jet engine which has a thrust to weight ratio of at least 8:1, the engine having a downwardly facing outlet nozzle, at least one deflector mounted adjacent thereto, each deflector having a flat main portion, a hinge at one end of the main portion about which the deflector is movable, and a toe portion which is disposed at the end of the main portion remote from the hinge and which is inclined to the main portion, and means for moving the deflector between an inoperative position in which jet efflux from the outlet nozzle is undeflected and an operative position in which the main portion is inclined to the vertical and in which said jet efflux is deflected by the main portion away from the vertical and further deflected away from the vertical by the toe portion to facilitate ground running of the engine.

2. A vertical lift jet engine as claimed in claim 1 in which the deflector is also movable into a further position in which it blanks off the said outlet nozzle.

3. A vertical lift jet engine as claimed in claim 1 in which the deflector is also movable into a retracted position in which it is spaced from its outlet nozzle so as to eliminate drag during forward flight.

4. A vertical lift jet engine as claimed in claim 1 in which each deflector in said operative position deflects the jet efflux away from the vertical to strike a horizontal surface at an angle of less than 30°.

5. A vertical lift jet engine as claimed in claim 1 in which the main portion of each deflector is trough-shaped.

6. A vertical lift jet engine as claimed in claim 1 in which said toe portion has alternate parts which are arranged at an angle to each other.

7. A vertical lift jet engine as claimed in claim 1 including a throttle control which controls the operation of each deflector, the throttle control placing each deflector in its operative position while the engine is being started and run up to ground idling speed, and placing each deflector in the inoperative position when the engine is being run at take-off speed.

References Cited

UNITED STATES PATENTS

| | | | |
|---|---|---|---|
| 2,951,660 | 9/1960 | Giliberty | 244—23 |
| 3,021,668 | 2/1962 | Longstreet | 60—35.6 |
| 3,033,493 | 5/1962 | Wilde et al. | 244—52 X |
| 3,155,342 | 11/1964 | Bolkow et al. | 60—35.54 X |

JULIUS E. WEST, *Primary Examiner.*